US010201261B2

(12) United States Patent
Tanaka et al.

(10) Patent No.: US 10,201,261 B2
(45) Date of Patent: Feb. 12, 2019

(54) AUTONOMOUS TRAVELING BODY

(71) Applicant: TOSHIBA LIFESTYLE PRODUCTS & SERVICES CORPORATION, Kawasaki-shi (JP)

(72) Inventors: Masatoshi Tanaka, Seto (JP); Atsushi Morishita, Hadano (JP); Hiromitsu Ichikawa, Owariasahi (JP); Hiromitsu Murata, Kasugai (JP); Yukio Machida, Owariasahi (JP)

(73) Assignee: TOSHIBA LIFESTYLE PRODUCTS & SERVICES CORPORATION, Kawasaki-shi (JP)

( * ) Notice: Subject to any disclaimer, the term of this patent is extended or adjusted under 35 U.S.C. 154(b) by 26 days.

(21) Appl. No.: 15/304,979

(22) PCT Filed: Apr. 22, 2015

(86) PCT No.: PCT/JP2015/062265
§ 371 (c)(1),
(2) Date: Oct. 18, 2016

(87) PCT Pub. No.: WO2015/163374
PCT Pub. Date: Oct. 29, 2015

(65) Prior Publication Data
US 2017/0181591 A1    Jun. 29, 2017

(30) Foreign Application Priority Data

Apr. 22, 2014  (JP) .................................. 2014-088362

(51) Int. Cl.
*A47L 9/28*   (2006.01)
*A47L 9/00*   (2006.01)
(Continued)

(52) U.S. Cl.
CPC ............... *A47L 9/2805* (2013.01); *A47L 9/00* (2013.01); *A47L 9/009* (2013.01); *A47L 9/28* (2013.01);
(Continued)

(58) Field of Classification Search
CPC ...... A47L 9/2805; A47L 9/2852; A47L 9/009; A47L 9/28; A47L 2201/04; B25J 9/0003; B25J 9/1676; B25J 11/0085; B25J 9/1666
(Continued)

(56) References Cited

U.S. PATENT DOCUMENTS 9,615,714 B2 *   4/2017   Jang .................... A47L 11/4061
2003/0025472 A1  2/2003   Jones et al.
(Continued)

FOREIGN PATENT DOCUMENTS

CN   1274271 C     9/2006
CN   103702805 A   4/2014
(Continued)

*Primary Examiner* — David Redding
(74) *Attorney, Agent, or Firm* — Oblon, McClelland, Maier & Neustadt, L.L.P.

(57) ABSTRACT

A vacuum cleaner includes link mechanisms that connect a bumper to be movable in a relatively horizontal direction with respect to a case main body. A coil spring energizes the bumper in a direction separated from the case main body. Obstacle sensors are arranged at positions facing the bumper in the case main body, and detect an obstacle by detecting movement of the bumper, due to contact with the obstacle, in at least one of a direction opposite to an energizing direction of the coil spring and a direction crossing such a direction. A controller controls the drive of a driving wheel based on detection of the obstacle by the obstacle sensor to allow the main body case to travel autonomously. The vacuum cleaner can detect an obstacle brought into contact with the bumper in a wide range with a simple configuration.

8 Claims, 9 Drawing Sheets

(51) Int. Cl.
*G05D 1/02* (2006.01)
*B25J 9/00* (2006.01)
*B25J 9/16* (2006.01)
*B25J 11/00* (2006.01)

(52) U.S. Cl.
CPC .......... *A47L 9/2852* (2013.01); *B25J 9/0003* (2013.01); *B25J 9/0015* (2013.01); *B25J 9/0027* (2013.01); *B25J 9/1666* (2013.01); *B25J 9/1676* (2013.01); *B25J 11/0085* (2013.01); *G05D 1/02* (2013.01); *G05D 1/0227* (2013.01); *A47L 2201/04* (2013.01)

(58) Field of Classification Search
USPC .......................................................... 15/319
See application file for complete search history.

(56) References Cited

U.S. PATENT DOCUMENTS

| | | |
|---|---|---|
| 2004/0143930 A1 | 7/2004 | Haegermarck |
| 2004/0207355 A1 | 10/2004 | Jones et al. |
| 2005/0021181 A1 | 1/2005 | Kim et al. |
| 2007/0213892 A1 | 9/2007 | Jones et al. |
| 2007/0285041 A1 | 12/2007 | Jones et al. |
| 2008/0001566 A1 | 1/2008 | Jones et al. |
| 2008/0007193 A1 | 1/2008 | Jones et al. |
| 2010/0049365 A1 | 2/2010 | Jones et al. |
| 2010/0263142 A1 | 10/2010 | Jones et al. |
| 2013/0325178 A1 | 12/2013 | Jones et al. |
| 2014/0138964 A1 | 5/2014 | Shin et al. |

FOREIGN PATENT DOCUMENTS

| | | |
|---|---|---|
| FR | 2 857 844 A1 | 1/2005 |
| JP | 2005-40596 A | 2/2005 |
| JP | 2005-271152 A | 10/2005 |
| JP | 2005-280423 A | 10/2005 |
| JP | 2007-330567 A | 12/2007 |
| JP | 2012-64240 A | 3/2012 |
| WO | WO 02/067745 A1 | 9/2002 |
| WO | WO 2008/007830 A1 | 1/2008 |
| WO | WO 2013/006005 A2 | 1/2013 |

* cited by examiner

AUTONOMOUS TRAVELING BODY

CROSS REFERENCE TO RELATED APPLICATIONS

The present application is a National Stage Application of PCT/JP2015/062265 filed on Apr. 22, 2015. The PCT application claims priority to Japanese Patent Application No. 2014-088362 filed on Apr. 22, 2014. All of the above applications are herein incorporated by reference in their entirety.

FIELD

Embodiments described herein relate generally to an autonomous traveling body including a main body case with a movable bumper.

BACKGROUND

Conventionally, there is known a so-called autonomous traveling type vacuum cleaner (cleaning robot) that cleans a floor surface to be cleaned while traveling autonomously thereon. In such a vacuum cleaner, a bumper forming a part of a contour of a main body case is moved due to contact (collision) with an obstacle, thereby operating a microswitch. In this manner, an obstacle is detected, and the vacuum cleaner is controlled to travel while avoiding the detected obstacle.

In this configuration, the bumper is guided to be movable in a front-rear direction in a case main body that is a main body part of the main body case. Thus, it is possible to detect an obstacle brought into contact from the front of the vacuum cleaner, while a separate component and the like is required to detect an obstacle brought into contact from the lateral sides or the oblique front side of the vacuum cleaner, for example.

CITATION LIST

Patent Literature

PTL 1: Japanese Laid-open Patent Publication No. 2005-40596

Technical Problem

The present invention aims at providing an autonomous traveling body capable of detecting an obstacle brought into contact with a bumper in a wide range with a simple configuration.

Solution to Problem

The autonomous traveling body of the embodiment includes the main body case, driving wheels, link mechanisms, a bumper energizing body, a pair of obstacle detection units, and a control unit. The main body case includes a main body part and a bumper arranged along the outer edge of the main body part. The driving wheels enable the main body case to travel. The link mechanisms connect the bumper to be movable in a relatively horizontal direction with respect to the main body part. The bumper energizing body energizes the bumper in a direction separated from the main body part. The pair of obstacle detection, units is arranged respectively at positions facing the bumper in the main body part. Moreover, the pair of obstacle detection units detects an obstacle by detecting the movement of the bumper, due to contact, with the obstacle, in at least one of a direction opposite to the energizing direction of the bumper energizing body and a direction crossing such a direction. The control unit controls the drive of the driving wheels based on the detection of the obstacle by the obstacle detection units to allow the main body case to travel autonomously.

DETAILED DESCRIPTION

The configuration of an embodiment will be described below with reference to FIG. 1 to FIG. 10.

Figure 9:
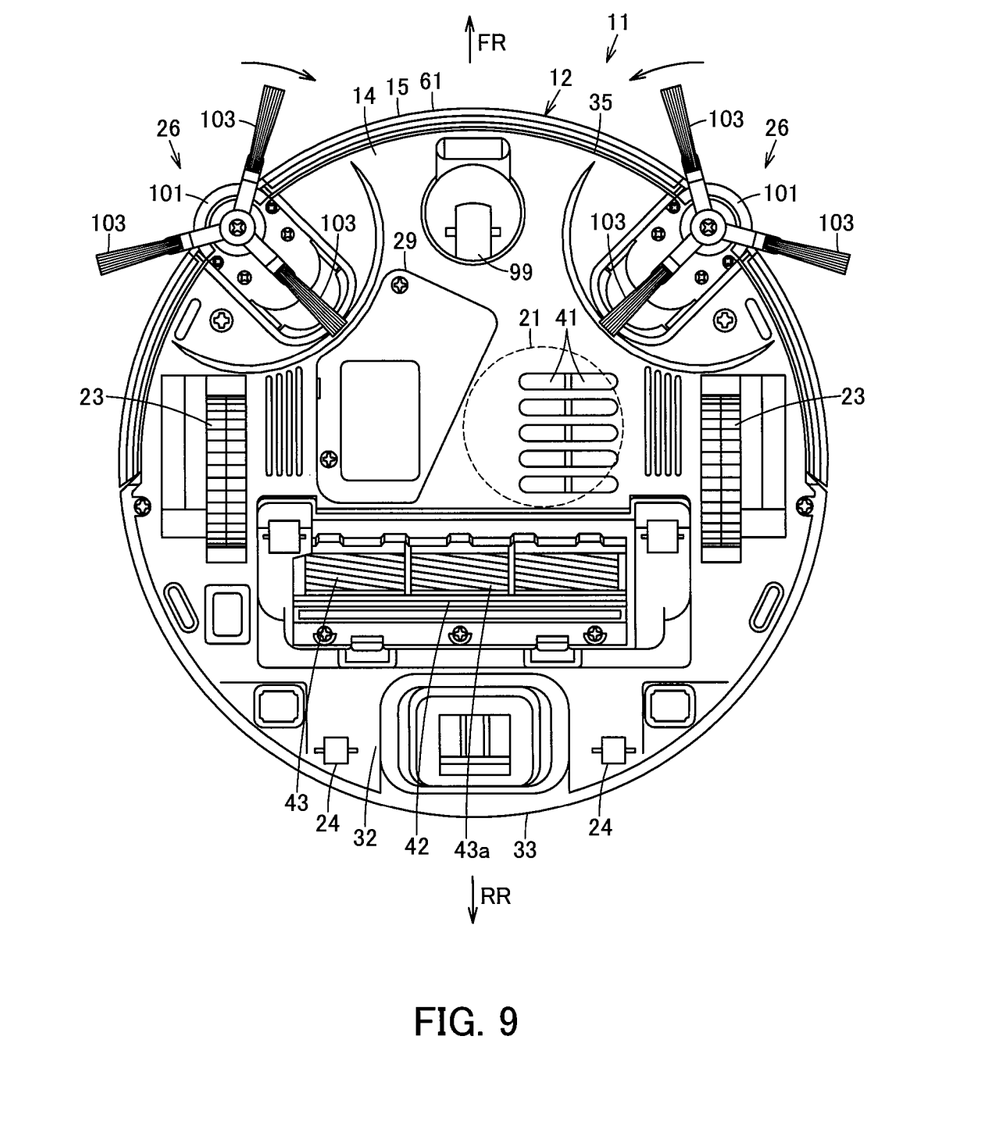
FIG. 9 is a plan view illustrating the autonomous traveling body according to the embodiment from the bottom side.
Figure 10:
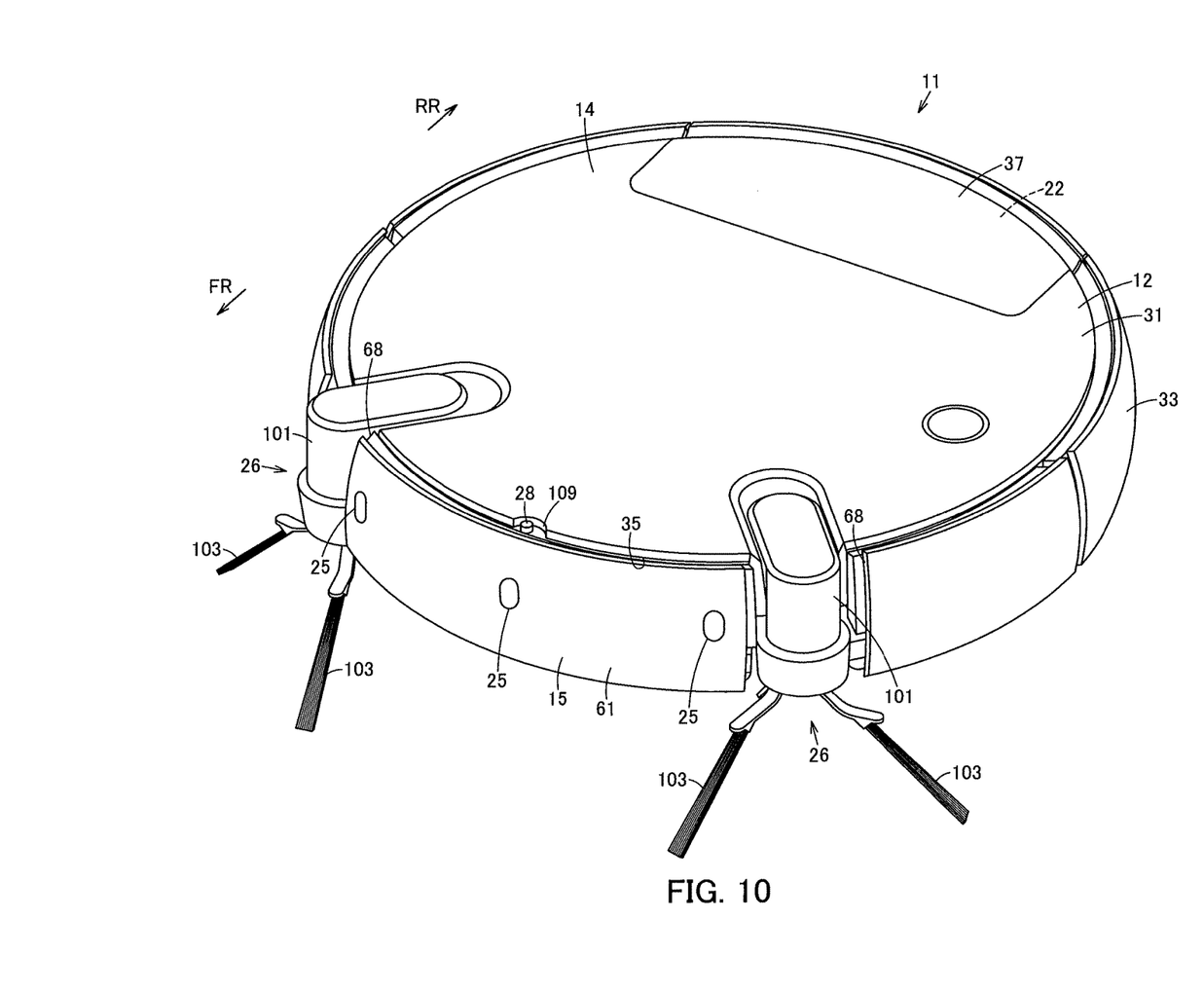
FIG. 10 is a perspective view illustrating the autonomous traveling body according to the embodiment.

In FIG. 9 and FIG. 10, the numerical symbol 11 represents a vacuum cleaner as an autonomous traveling body. This vacuum, cleaner 11 will, in this embodiment, be explained below exemplifying, as the vacuum cleaner II, a so-called autonomous traveling type robot cleaner that cleans a surface to be cleaned (floor surface) while traveling autonomously (propelling itself) thereon.

Figure 5A:
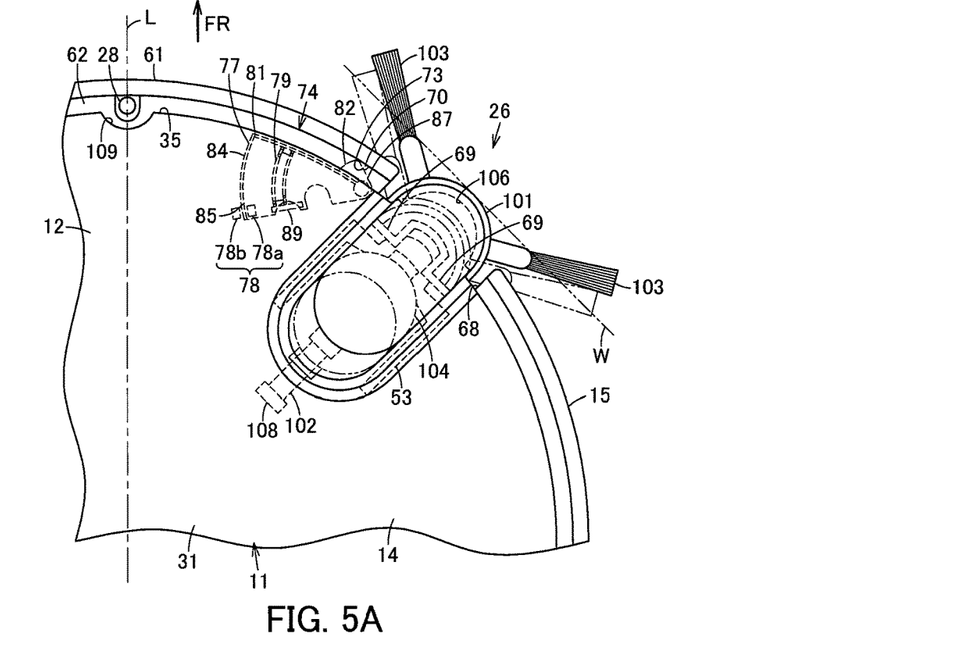
FIG. 5A is a plan view schematically illustrating a state where the bumper of the autonomous traveling body according to the embodiment moves in a first moving range and FIG. 5B is a plan view schematically illustrating a state where the bumper of the autonomous traveling body moves in a second moving range.
Figure 5B:
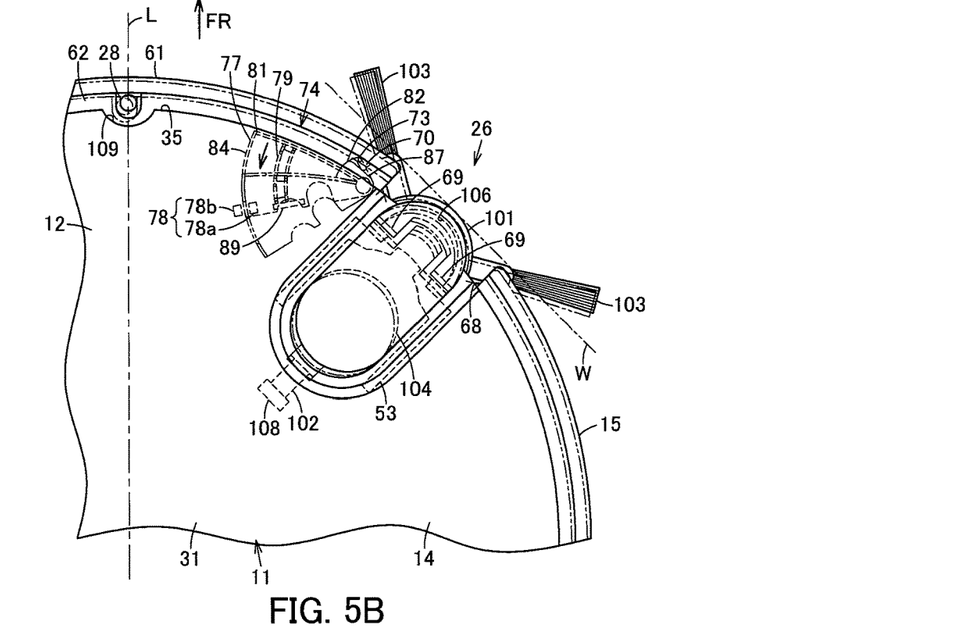
Figure 6:
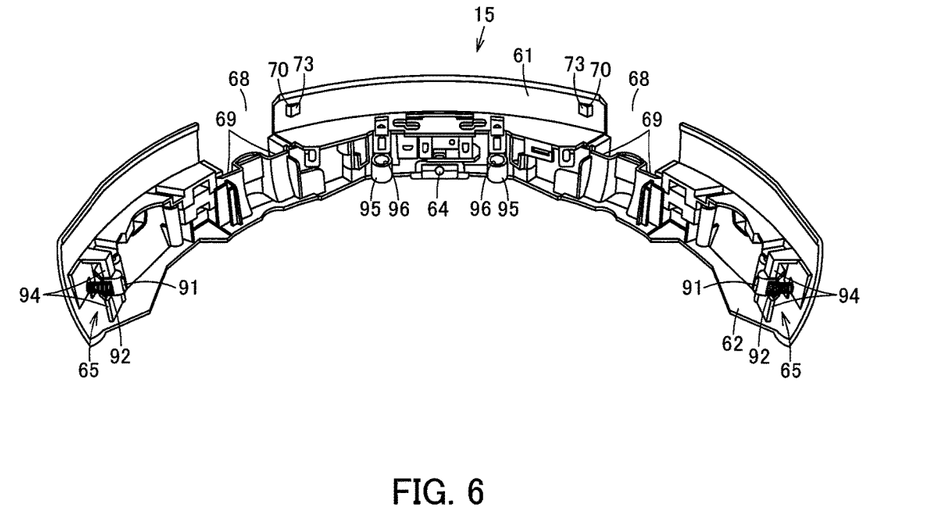
FIG. 6 is a perspective view illustrating the bumper of the autonomous traveling body according to the embodiment from the lower side.
Figure 7:
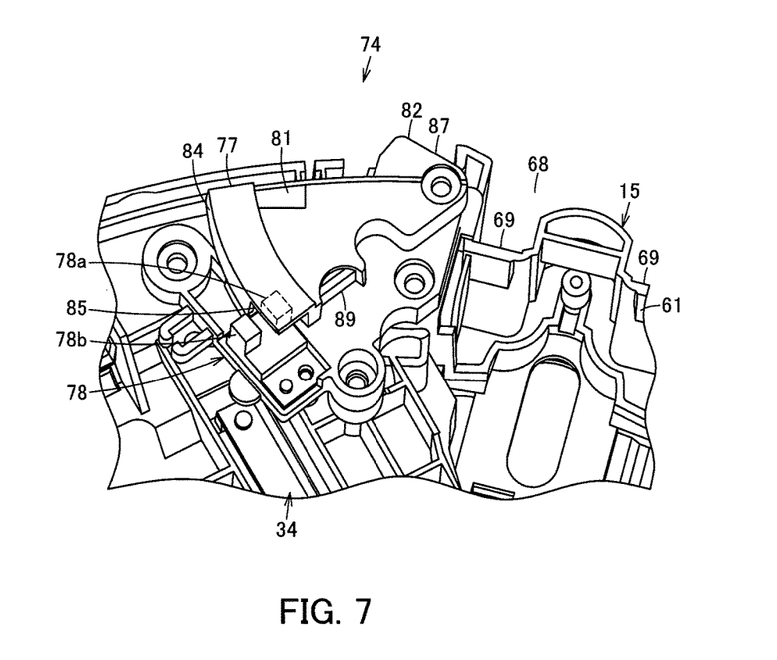
FIG. 7 is a perspective view illustrating an obstacle detection unit of the autonomous traveling body according to the embodiment from the lower side.
Figure 8:
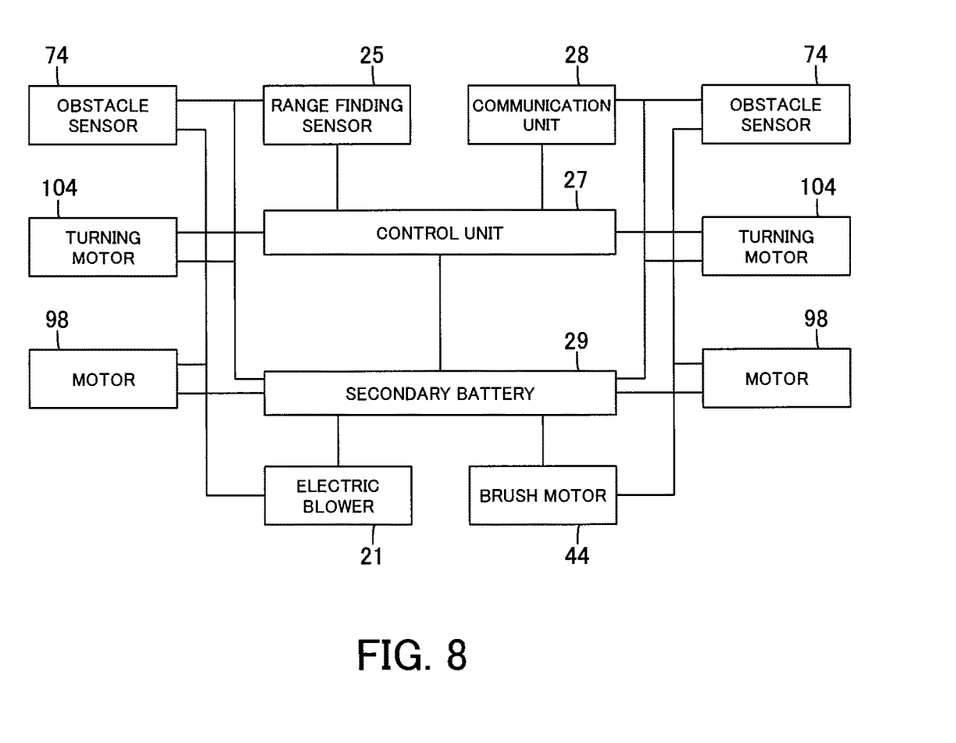
FIG. 8 is a block diagram illustrating an inner configuration of the autonomous traveling body according to the embodiment.

The vacuum cleaner 11 includes a hollow main body case 12. In the main body case 12, a case main body 14 as a main body part and a bumper 15 that is a buffer member arranged on the outer edge of the case main body 14 to form a part of the contour (outer peripheral surface) of the main body case 12 are connected to be movable through (a pair of) link mechanisms 16, 16 forming a pair. The main body case 12 is configured to have a flat cylindrical shape (disk shape) and the like as a whole. In the main body case 12, an electric blower 21 is housed in the case main body 14, and a dust collection unit 22 communicating with the suction side of the electric blower 21 is provided to be removable on the rear side, for example. Moreover, the main body case 12 is provided with a plurality (pair) of driving wheels 23 as drive units, a plurality of driven wheels 24, a plurality of range finding sensors 25 as distance detection means (distance detecting unit), a pair of side brushes 26, 26 that is turning cleaning parts as cleaning parts, a control unit (control means) 27 constituted by a circuit board and the like, a communication unit 28 for wireless communication with an external device, and a secondary battery 29 that is a battery constituting a power supply unit. Note that the following explanation will be given assuming that the direction along the traveling direction of the vacuum cleaner 11 (main body case 12) is referred to as a front-rear direction (FR, RR directions illustrated by arrows in FIG. 9, etc.), and the right-left direction (both side direction) crossing (orthogonal to) the front-rear direction is referred to as a width direction, with the state in which the vacuum cleaner 11 is placed on a flat surface to be cleaned, as a reference. Moreover, FIGS. 5A and 5B and FIG. 7 illustrate only one side (right side) of the vacuum cleaner 11 and the illustration of the other side (left side) is omitted because the vacuum cleaner 11 is formed to be substantially line-symmetrical in the width direction.

Roughly speaking, the outer surface of the case main body 14 is covered with an upper surface 31 that is a decorative plate formed of a hard synthetic resin, for example, a bottom surface 32 that is a decorative plate, and a rear outer peripheral surface 33 that is a decorative plate as a main body part outer surface (case main body outer surface). In the interior surrounded, by the upper surface 31, the bottom surface 32, and the rear outer peripheral surface 33, a structure part 34 constituted by a plurality of case bodies is formed. Then, a part from both sides to the front side of the case main body 14 is an arc opening part 35 in which the bumper 15 is engaged.

The upper surface 31 constitutes an upper surface of the main body case 12 along a horizontal direction, and has a circular flat-plate form in a planar view. On the rear side of the upper surface 31, there is provided a dust collection unit lid portion 37 that is opened and closed when the dust collection unit 22 is attached and removed.

The bottom surface 32 constitutes a bottom surface of the main body case 12 along a horizontal direction, and has a circular flat-plate form in a planar view. On the bottom surface 32, a plurality of exhaust ports 41 for discharging exhaust air from the electric blower 21 and a suction port 42 that is a dust collection port communicating with the dust collection unit 22 are open, and the driving wheels 23, 23 are arranged at positions close to the front of both sides of the suction port 42. A rotary brush 43 as a rotary cleaning body is attached to be rotatable to the suction port 42. The rotary brush 43 provided, with cleaning members 43a such as a bristle brush and a blade on the outer peripheral surface thereof, is rotated by a brush motor 44 (FIG. 8) as rotary drive means (rotary drive unit), so that the cleaning members 43a are repeatedly brought into contact with a surface to be cleaned, thus raking dust on the surface to be cleaned.

The rear outer peripheral surface 33 constitutes a part from both sides to the rear side of the case main body 14, that is, the outer peripheral surface (contour) of a substantially rear-half of the main body case 12. The rear outer peripheral surface 33 is formed, to have a semicircular arc shaped cylindrical surface with a given diameter dimension and with an axis direction along a vertical direction, and is arranged to be continuous to the upper surface 31 and the bottom surface 32.

The structure part 34 is a part basically housed inside of the main body case 12 without being exposed outside of the main body case 12. At the front end part of the structure part 34, there are formed cylindrical (boss-shaped) pivotally supporting parts 51, 51 as main body part side pivotally supporting parts forming a part of the link mechanisms 16, 16 and an energization receiving part 52 positioned between the pivotally supporting parts 51, 51. Moreover, there are formed guiding parts 53 guiding each of the side brushes 26 along the radial direction of the main body case 12 (case main body 14).

The pivotally supporting parts 51, 51 are arranged to be separate from each other at positions substantially line-symmetrical to each other with respect to a center line L in the width direction of the structure part 34 (main body case 12 (case main body 14)), and are projected vertically upward from the upper part of the upper surface 31 of the structure part 34 facing the lower part.

The energization receiving part 52 is a part that receives and holds a rear end part of a coil spring 55 as bumper energizing means (bumper energizing body) energizing, at a position between the link mechanisms 16, 16, the bumper 15 forward to an advancing direction relative to the case main body 14 (direction separated from the case main body 14) so as to restore the bumper 15 to a normal position. The energization receiving part 52 is located at a position overlapping the center line L in the width direction of the structure part 34 (main body case 12 (case main body 14)), that is, at a center portion in the width direction of the structure part 34 (main body case 12 (case main body 14)).

Each guiding part 53 guides the side brushes 26, 26 to be capable of reciprocating in a projecting direction relative to the main body case 12 and the opposite direction thereof, and serves as stopper of the side brushes 26, 26 when the side brushes 26, 26 are projected to a maximum state with respect to the main body case 12. The guiding parts 53 are formed, for example, on both sides in the width direction of the structure part 34 (main body case 12 (case main body 14)), at oblique both sides in the front direction relative to the center portion in the front-rear direction of the main body case 12 (45° in the front-side right and left directions of the main body case 12) in the embodiment. Note that, in the following, the direction in which the side brush 26 is projected from the contour of the main body case 12 is referred to as a projecting direction, and the opposite direction thereof is referred to as a retracting direction.

Meanwhile, as illustrated in FIG. 1 to FIG. 6, FIG. 9, FIG. 10 and the like, for example, the bumper 15 elastically reduces an impact of contact (collision) with an obstacle W or the like, and is formed of a rigid, synthetic resin (rigid body), for example, and provided with a bumper main body 61 being curved in a cylindrical surface form and constituting a part from both sides to the front side of the main body case 12, that is, the outer peripheral surface (contour) of a substantially front half of the main body case 12; a plate-shaped extension part 62 extended rearward from the upper end part of the bumper main body 61; bumper side pivotally supporting parts 63, 63 projected on the bumper main body 61 to form a part of the link mechanisms 16, 16; a bumper side energization receiving part 64 provided between the bumper side pivotally supporting parts 63, 63 in the bumper main body 61; and side levers 65 provided in the bumper main body 61. Then, the bumper 15 is engaged in the opening part 35 of the case main body 14, and can reciprocate along the radial direction of the case main body 14.

The bumper main body 61 has a semicircular arc shape along an arc with a same diameter as the rear outer peripheral surface 33 with an axis direction along a vertical direction, and forms, together with the rear outer peripheral surface 33, a substantially one cylindrical surface (substantially one circle in a planar view) when the bumper 15 is at a normal position where the obstacle W or the like is not, in contact with the bumper 15 (no load is applied). Therefore, the rear-outer peripheral surface 33 and the bumper main body 61 constitute the outer peripheral surface of the main body case 12. Moreover, the bumper main body 61 is separate by a given space in the radial direction relative to the outer edge from, both sides to the front side of the case main body 14, and such space is a maximum stroke with which the bumper 15 can reciprocate. Furthermore, in the bumper main body 61, brush engagement parts 68, 68 as cleaning part engagement parts in which the side brushes 26, 26 are engaged are recessed in the radial direction at positions corresponding to the guiding parts 53 of the structure part 34, and contact parts 69, 69 that can be in contact with each side brush 26 are provided inside of each of the brush engagement parts 68. Then, in the bumper main body 61, projections 70, 70 as pressing parts are projected on the inner surface facing the case main body 14.

Each brush engagement part 68 is recessed to the inner peripheral side with respect to an envelope surface that is a virtual arc surface including an outer peripheral surface forming the contour of the bumper main body 61 (bumper 15).

Each contact part 69 is brought into contact with each side brush 26 in the state where the side brush 26 has been moved by a given amount or more in the retracting direction relative to the main body case 12, so that each side brush 26 and the bumper 15 reciprocate by interlocking with each other.

Each projection 70 has an inclined plane-shaped contact surface 73. Such a contact surface 73 is constantly in contact with an obstacle sensor 74 that is obstacle detection means (obstacle detection unit) arranged in the case main body 14 (structure part 34) when the bumper 15 is at a normal position, operating each obstacle sensor 74. Moreover, in the vicinity of each brush engagement part 68, each projection 70 is arranged at a position on the center line L side relative to each brush engagement part 68.

Each contact surface 73 is projected from the inner surface of the bumper main body 61 so that a projection amount to the side of the center axis (rear side) of the bumper main body 61 becomes larger with an increasing distance from, the center line L. That is, a surface direction of each contact surface 73 has vector components along the front-rear direction and vector components along the right-left direction. In other words, each contact surface 73 is inclined along a direction crossing the front-rear direction and the right-left direction. Because of this, the contact surfaces 73, 73 are inclined in a chevron form, when viewed from the upper side. Moreover, each contact surface 73 is arranged to be directed to the center line L side.

As illustrated in FIG. 1 to FIG. 5, and FIG. 7, when the bumper 15 and the side brushes 26, 26 move in the retracting direction due to contact with the obstacle W, the obstacle sensors 74, 74 are brought into contact with the projections 70 (contact surfaces 73) or the inner surface of the bumper main body 61, thus detecting such movement and then detecting the obstacle W by such detection of the movement. In the lower part of the structure part 34, for example, the obstacle sensors 74, 74 are arranged to be substantially line-symmetrical in the vicinity of the center line L on both sides thereof, and are positioned facing the bottom, surface 32 (FIG. 9) and facing the inner surface of the bumper 15 on the lower side of the case main body 14. The obstacle sensors 74, 74 are positioned further on the upper side than the bottom surface 32 of the main body case 12 and are housed inside of the main body case 12. Each obstacle sensor 74 includes contacts 77 rotatable by contact with the bumper 15 side, a sensor unit 78 that is a detection means main body part (detection unit main body part) detecting the rotation of each contact 77, and As illustrated in FIG. 1 to FIGS. 5A and 5B, and FIG. 7, when the bumper 15 and the side brushes 26, 26 move in the retracting direction due to contact with the obstacle W, the obstacle sensors 74, 74 are brought into contact with the projections 70 (contact surfaces 73) or the inner surface of the bumper main body 61, thus detecting such movement and then detecting the obstacle W by such detection of the movement. In the lower part of the structure part 34, for example, the obstacle sensors 74, 74 are arranged to be substantially line-symmetrical in the vicinity of the center line L on both sides thereof, and are positioned facing the bottom surface 32 (FIG. 9) and facing the inner surface of the bumper 15 on the lower side of the case main body 14. The obstacle sensors 74, 74 are positioned further on the upper side than the bottom surface 32 of the main body case 12 and are housed inside of the main body case 12. Each obstacle sensor 74 includes contacts 77 rotatable by contact with the bumper 15 side, a sensor unit 78 that is a detection means main body part (detection unit main body part) detecting the rotation of each contact 77, and a contact spring 79 ascontact energizing means (contact energizing body) energizing each contact 77 in a direction rotating toward the bumper 15.

Each contact 77 integrally includes a contact main body 81 formed to have a substantially fan shape and a contact portion 82 formed to have a substantially fan shape with the same axis as the contact main body 81. Then, at a center position of the fan shape of the contact main body 81 and the contact portion 82, each contact 77 is pivotally supported at a position in the vicinity of the outer edge of the case main body 14, and the center line L side can be rotated along the front-rear direction.

The contact main body 81 is a part positioned on the inner side (opposite side of the bumper 15 (opposite side of the bumper main body 61) side) relative to the outer edge of the case main body 14. The outer peripheral surface of the contact main body 81 is an arc shaped sensing surface 84 directed to the center line L side. The sensing surface 84 is positioned along the front-rear direction, and a notch 85 is formed at a rear end position. Note that the sensing surface 84 is preferably coated in black, for example, so that light is hardly reflected thereon.

The contact portion 82 has a fan shape smaller in diameter dimension than the contact main body 81, and is projected, on the front side of the contact main body 81, to the outer side (bumper 15 (bumper main body 61) side) than the outer edge of the case main body 14 to face the bumper 15 (bumper main body 61). In the front part of the contact portion 82, there is formed an action surface 87 constantly in contact with the contact surface 73 of the bumper 15 when the bumper 15 is at a normal position. The action surface 87 is a portion forming the front edge of the contact portion 82, and extends forward and toward the center line L side along a tangent direction of the rotation (rotation axis) of the contact 77 to be substantially parallel to the contact surface 73 when the bumper 15 is at a normal position. Therefore, the surface direction of each action surface 87 has vector components along the front-rear direction and vector components along the right-left direction. In other words, each action surface 87 is inclined along a direction crossing the front-rear direction, and the right-left direction respectively. Moreover, each action surface 87 is arranged to be directed to the outside in the width direction that is the opposite side relative to the center line L. That is, each action surface 87 is positioned on the opposite side of the sensing surface 84 in each contact 77.

Each sensor unit 78 is a non-contact type photo interrupter, for example, and is arranged in the case main body 14 so that a light emitting part 78*a* and a light receiving part 78*b* face each other with the sensing surface 84 of the contact main body 81 of each, contact 77 interposed therebetween. The notch 85 is positioned between the light emitting part 78*a* and the light receiving part 78*b* when the bumper 15 is at a normal position, and the sensing surface 84 is interposed between the light emitting part 78*a* and the light receiving part 78*b* by the rotation of the contact 77.

One end part of each contact spring 75 is held by each contact 77 (contact main body 81), and the other end part thereof is held by a spring receiving part 89 as the energizing means receiving part (energizing body receiving part) provided in the case main body 14. The spring receiving part 89 has a function of a rotation restriction unit restricting a range of the rotation of the contact 77 in the forward direction (advancing direction) that is the bumper 15 side by being in contact with the contact main body 81 when, the bumper 15 is at a normal position.

The extension part 62 formed to be a flat plate shape is inserted to the opening part 35 to be in close contact, with the lower part of the upper surface 31, thereby closing the upper surface of space between the bumper main body 61 and the outer edge of the case main body 14. That is, when the bumper 15 reciprocates, the extension part 62 is brought into slidable contact along the lower part of the upper surface 31.

The bumper side pivotally supporting parts 63, 63 are arranged to be separate from each other at positions substantially line-symmetrical to each other with respect to the center line L in the width direction of the bumper 15 (main body case 12), and are projected vertically upward from the lower part of the bumper main body 61. The upper parts of the bumper side pivotally supporting parts 63, 63 are covered by the extension part 62. Then, the bumper side pivotally supporting parts 63, 63 and the pivotally supporting parts 51, 51 of the structure part. 34 are connected to each other.

The bumper side energization receiving part 64 is a portion that receives and holds the front end part of the coil spring 55, and is provided at a position overlapping the center line L in the width direction of the bumper main body 61 (main body case 12 (bumper 15)), that is, at a center portion in the width direction of the bumper main body 61 (main body case 12 (bumper 15)). Therefore, the coil spring 55 is linearly held along the front-rear direction with the center line L as a center axis when the bumper 15 is at a normal position.

Each side lever 65 supports the bumper 15 against contact (collision) of the obstacle W from the lateral side. As illustrated in FIG. 1 to FIG. 3, and FIG. 6, the side levers 65 are arranged on the inner surface facing the case main body 14 at both ends (both sides) of the bumper main body 61. The side lever 65 includes a lever main body 91 pivotally supported by the bumper main body 61 to be rotatable and a coil spring 92 as lever energizing means (lever energizing body) energizing the lever main body 91 in the projecting direction.

The front side of the lever main body 91 is pivotally supported by the bumper main body 61 to be rotatable along the right-left direction. The distal end part of the lever main body 91 is formed to be a semicylindrical shape so as to be engaged in a receiving part 93 recessed in a cross-section arc shape on both sides of the case main body 14. This engagement in the receiving part 93 restricts the position of the bumper 15 in the front-rear direction with respect to the case main body 14. Moreover, the lever main body 91 is in contact with a stopper portion 94 provided in the bumper main body 61 when the bumper 15 is at a normal position, whereby the rotation of the lever main body 91 to the direction projecting from the bumper main body 61 is restricted.

Each link mechanism 16 includes the above-described pivotally supporting part 51, the above-described bumper side pivotally supporting part 63, and a connector 95 connecting the pivotally supporting part 51 and the bumper side pivotally supporting part 63, and connects the bumper 15 to be movable in a relatively horizontal direction with respect to the case main body 14.

The front end part of the connector 95 is pivotally supported to be rotatable in a peripheral direction by the bumper side pivotally supporting part 63. In addition, on the rear end side of the connector 95, there is formed a long hole 96 through which the pivotally supporting part 51 is inserted to be slidable and rotatable in a peripheral direction. Then, each connector 95 rotates relative to the bumper side pivotally supporting part 63 (bumper 15), and the pivotally supporting part 51 slides along the long hole 96 and rotates in the long hole 96, whereby the bumper 15 can freely move along the horizontal direction with respect to the case main body 14. That is, the case main body 14, the bumper 15, and the connectors 95, 95 constitute a link device.

Then, each link mechanism 16, the coil spring 55, and each side lever 65 center the bumper 15 and the case main body 14 so that the center lines L thereof substantially match each other, and the bumper 15 is constantly energized in a direction for maintaining its normal position.

The electric blower 21 is housed in the main body case 12 at a position between the driving wheels 23, 23, for example. The suction side of the electric blower 21 is air-tightly connected to the dust collection unit 22.

The dust collection unit 22 stores therein dust sucked through the suction port 42 by the drive of the electric blower 21, and is a dust collection box that can be attached to or removed from the main body case 12 in the embodiment.

The driving wheels 23, 23 enable the main body case 12 to travel (autonomously travel) on a surface to be cleaned, that is, the driving wheels 23, 23 are used for traveling. The driving wheels are formed to be a disk shape with a rotation axis along a horizontal direction (width direction), and arranged to be separate from each other in the width direction at positions near the center in the front-rear direction of the lower part of the main body case 12. Then, these driving wheels 23, 23 are driven to rotate through motors 98, 98 (FIG. 8) as drive means (drive unit).

Each of the motors 98, 98 is connected to each of the driving wheels 23, 23 through a gear box as drive transmission means (drive transmission unit) (not illustrated), and can drive each of the driving wheels 23, 23 independently. Then, each of the motors 98, 98, together with the driving wheels 23, 23 and each gear box, are energized integrally by suspension means (suspension unit (suspension)) (not illustrated) toward a direction projecting downward from the bottom surface 32 of the main body case 12. Such energization secures grip force of the driving wheels 23, 23 relative to a surface to be cleaned.

On the bottom surface 32 of the main body case 12, the driven wheels 24 (FIG. 9) are arranged to be appropriately rotatable at positions where they can support, together with the driving wheels 23, 23, the weight of the vacuum cleaner 11 with good balance. In particular, the driven wheel 24 positioned in the substantially center portion in the width direction of the bottom surface 32 of the main body case 12 and in the front part is a turning wheel 99 attached to the bottom surface 32 so as to be turnable, in parallel with respect to a surface to be cleaned.

The range finding sensor 25 is a non-contact type sensor such as an ultrasonic sensor or an infrared sensor, for example, and is arranged on the rear outer peripheral surface 33 of the case main body 14 and the bumper 15 (bumper main body 61) of the main body case 12 and can detect respectively the presence or absence of the obstacle (wall part) W outside the main body case 12, a distance and the like between such an obstacle W and the main body case 12, for example.

The side brushes 26, 26 perform cleaning by raking dust positioned on both sides of the suction port 42 not reached by the suction port 42, especially dust positioned further on the outer side than the contour (outer peripheral surface) of the main body case 12 or on the front side of the driving wheels 23, 23, such as a position close to a wall. The side brushes 26, 26 are arranged at positions of the brush engagement parts 68, 68 of the bumper 15, that is, positions on both sides in the width direction of the main body case 12, at oblique both sides in the front direction (45° in the front-side right and left directions of the main body case 12) relative to the center portion in the front-rear direction of the main body case 12 in the embodiment. At normal positions of the side brushes 26, 26 where no load is applied due to contact with the obstacle W, for example, the distal end side of these side brushes 26, 26 is projected further to the outer side than the contour of the main body case 12 (bumper 15), while the proximal end side thereof is positioned further on the inner side than the contour of the main body case 12 (bumper 15). Then, each of the side brushes 26, 26 includes a brush main body 101 as a cleaning part main body that can advance radially along the radial direction of the main body case 12 with respect to the contour of the main body case 12; a brush energizing spring 102 as cleaning part, energizing means (cleaning part energizing body) energizing the brush main body 101 in a direction projecting from the contour (outer peripheral surface) of the main body case 12; cleaning bodies 103 such as bristle brushes arranged to be rotatable at lower parts of the brush main body 101 facing a surface to be cleaned, and a turning motor 104 as turning drive means (turning drive unit) rotating the cleaning bodies 103.

The distal end side of the brush main body 101 is formed, to be a shape along an arc, e.g., an oval in the embodiment. Due to contact with the obstacle W or the like, the brush main body 101 (side brush 26) is moved in the retracting direction toward the main body case 12 in a given moving range, against energization of the brush energizing spring 102. The moving range of the brush main body 101 (side brush 26) includes a first moving range between a position at which the brush main body 101 is projected outward relative to the outer peripheral surface of the bumper main body 61 of the bumper 15 that is the contour (outer peripheral surface) of the main body case 12 and a position at which the brush main body 101 is substantially flush with the outer peripheral surface of the bumper main body 61 of the bumper 15, that is, a range in which the brush main body 101 can reciprocate without interlocking with the bumper 15; and a second moving range in which the brush main body 101 can reciprocate by interlocking integrally with the bumper 15 in the state where the brush main body 101 is substantially flush with the outer peripheral surface of the bumper main body 61 of the bumper 15. That is, inside of the brush main body 101, there is formed a brush contact part 106 that is an arc-shaped cleaning part contact portion whose both ends can be in contact with the contact parts 69, 69 of the bumper 15. In the first moving range, the brush contact part 106 is separate from the contact parts 69, 69. When the brush main body 101 (side brush 26) is moved to the boundary between the first moving range and the second moving range, the brush contact part 106 is brought into contact with the contact parts 69, 69, and the brush main body 101 reciprocates integrally with the bumper 15. In the embodiment, the first moving range is set to be wider than the second moving range. The first, moving range is a 10 mm stroke, for example, and the second moving range is a 5 mm stroke.

The brush energizing spring 102 is a coil spring, for example. One end side thereof is held by the turning motor 104, and the other end side thereof is held by a spring receiving part 108 as a cleaning part energizing means receiving part (cleaning part energizing body receiving unit) provided in the case main body 14. The brush energizing spring 102 energizes the brush main body 101 linearly along the radial direction of the main body case 12.

The turning motor 104 is attached integrally on the proximal end side of the brush main body 101, and is configured to rotate the cleaning bodies 103 in parallel with a surface to be cleaned, that is, to turn the cleaning body 103. In the embodiment, the turning motors 104, 104 turn the cleaning bodies 103, 103 in opposite directions from each other so as to rake dust positioned on both sides of the main body case 12 to the center side in the width direction of the main body case 12. That is, the turning motor 104 of the side brush 26 positioned on the left side turns the cleaning bodies 103 in a clockwise direction (right-handed direction), and the turning motor 104 of the side brush 26 positioned on the right side turns the cleaning bodies 103 in a counterclockwise direction (left-handed direction).

Then, the control unit 27 includes timing means (timing unit) such as a timer, storage means (storage) such as a memory, and a control unit main body such as a microcomputer, and is connected electrically with the electric blower 21, the range finding sensor 25, the communication unit 28, the brush motor 44, the obstacle sensors 74, 74, the motors 98, 98, the turning motors 104, 104, and the like. Based on detection results by the range finding sensor 25 and the obstacle sensors 74, 74, the control unit 27 can control, through the motors 98, 98, the drive of the driving wheels 23, 23 to allow the main body case 12 (vacuum cleaner 11) to travel autonomously while avoiding the obstacle W, and control the drive of the electric blower 21, the brush motor 44, the turning motors 104, 104 and the like so that the vacuum cleaner 11 performs cleaning.

The communication unit 28 is arranged in the center portion in the width direction at the extension part 62 of the bumper 15, and reciprocates integrally with the bumper 15. Therefore, an arc-shape notched recess 109 for avoiding interference with the communication unit 28 is cut out in the center portion in the width direction of the front end part of the upper surface 31 of the case main body 14.

The secondary battery 29 (FIG. 8) supplies electricity to the control unit 27, the electric blower 21, the range finding sensor 25, the communication unit 28, the brush motor 44, the motors 98, 98, the turning motors 104, 104, and the like. The secondary battery 29 is arranged at a position between the driving wheels 23, 23 on the rear side of the turning wheel, for example. The secondary battery 29 is connected electrically with a charging terminal positioned on the bottom surface 32 of the main body case 12, and can be charged when the charging terminal is connected to a given charging base (not illustrated) arranged at a given position in (of) a room, for example.

Next, the operation of the above-described embodiment will be described.

When the vacuum cleaner 11 is placed on a surface to be cleaned, the driving wheels 23, 23 are brought into contact with the surface to be cleaned. Then, due to the vacuum cleaner 11's own weight, the driving wheels 23, 23, together with each gear box, sink into the main body case 12, against energization of the suspension means (suspension unit), to a position where the driven wheel 24 (turning wheel 99) is in contact with the surface to be cleaned, and a given space is formed between the suction port 42 and the surface to be cleaned. Then, the vacuum cleaner 11 drives the electric blower 21 at a given time preliminarily set by the control unit 27, for example, and starts cleaning from the charging base, for example. Note that the cleaning start position can be set to an arbitrary position such as a traveling start position of the vacuum cleaner 11 or the entrance of a room.

In the vacuum cleaner 11, the control unit 27 drives the electric blower 21, and the motors 98, 98 detect a distance to the obstacle W and the like or contact with the obstacle W through the range finding sensor 25 or each obstacle sensor 74 so as to monitor a position or a traveling state of the vacuum cleaner 11. In accordance with such detection by the sensors 25, 74, the vacuum cleaner 11 travels on the surface to be cleaned while avoiding the obstacle W, and cleans the surface to be cleaned by operating the side brushes 26, 26 and the rotary brush 43 as needed.

Figure 1:
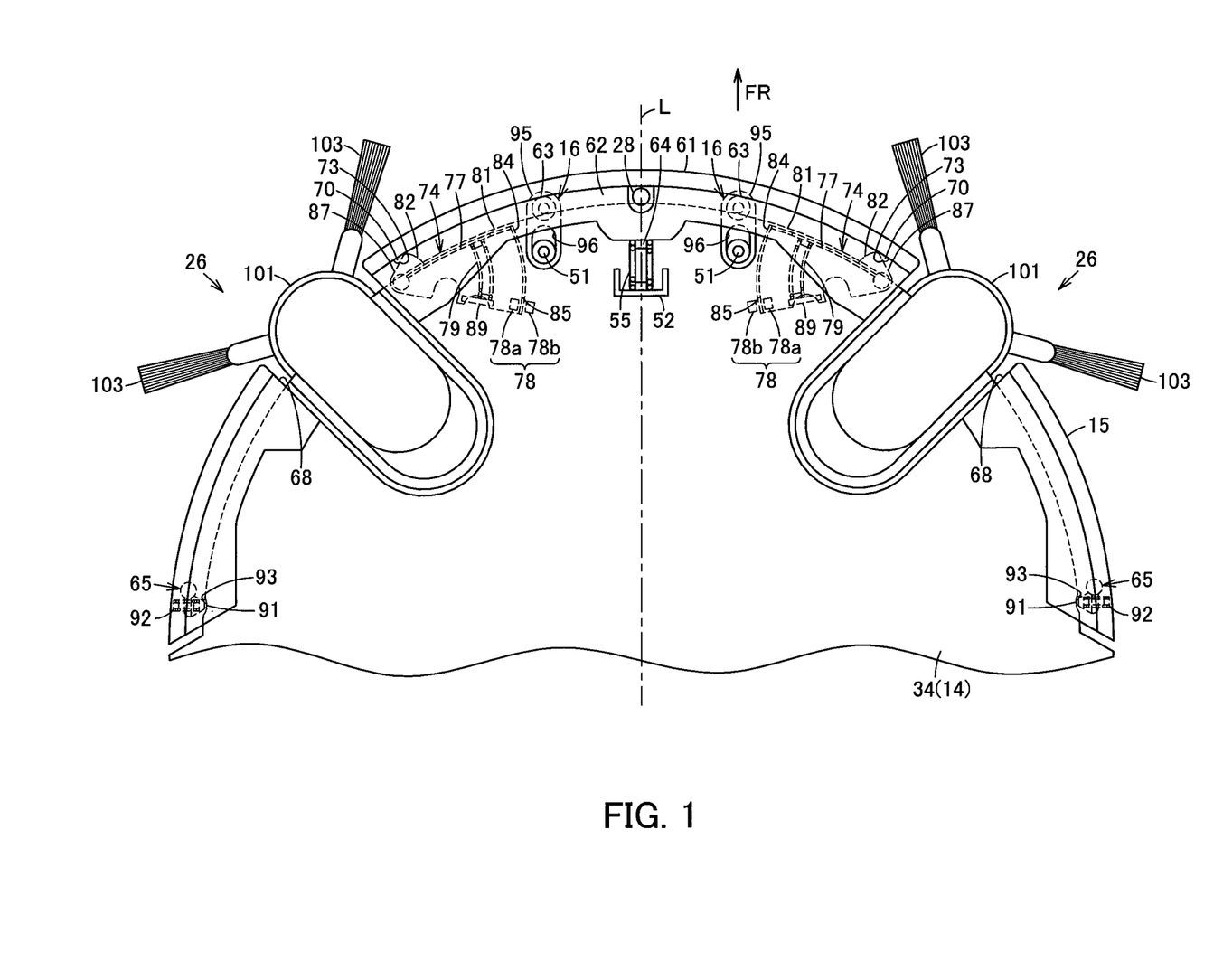
FIG. 1 is a plan view schematically illustrating a part of an autonomous traveling body according to an embodiment when a bumper is at a normal position.

For example, when the bumper 15 is at a normal position, as illustrated in FIG. 1, the notch 85 is positioned between the light emitting part 78a and the light receiving part 78b in each of the obstacle sensors 74, 74, so that light emitted from the light emitting part 78a can be received by the light receiving part 78b.

Figure 2:
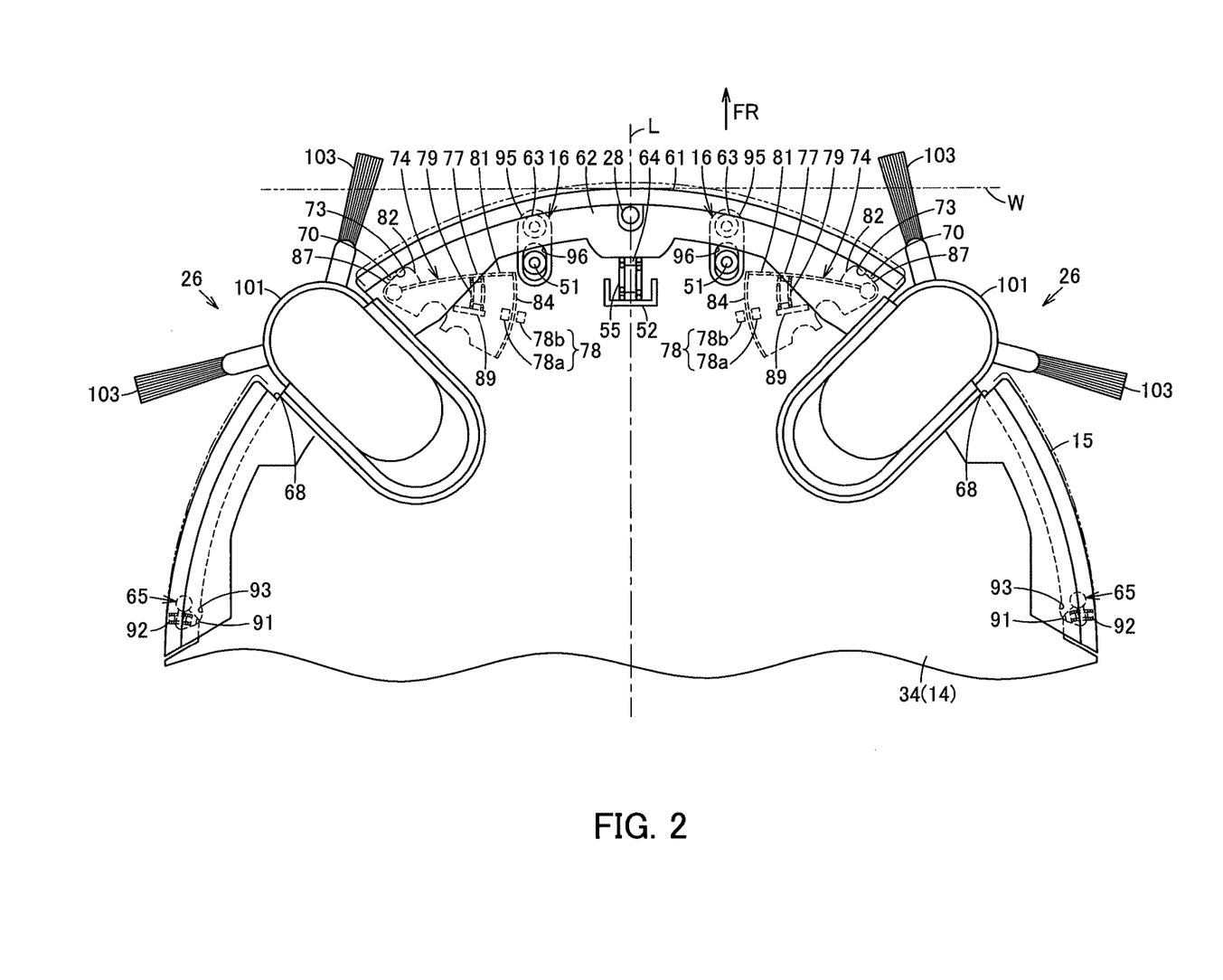
FIG. 2 is a plan view schematically illustrating a part of the autonomous traveling body according to the embodiment when an obstacle is brought into contact with the bumper from the front side.

On the other hand, when the obstacle W comes into contact with the front part of the bumper 15, as illustrated in FIG. 2, the bumper 15 is relatively moved rearward with respect to the case main body 14, against energization of the coil spring 55, that is, in the opposite direction of the energizing direction of the coil spring 55. At this time, the pivotally supporting part 51 of the case main body 14 slides relatively in the long hole 96 of the connector 95 of the link mechanism 16, and the lever main body 91 of the side lever 65 rotates outward against energization of the coil spring 92. Then, each projection 70 moves rearward integrally with the rearward movement of the bumper 15, whereby the contact surface 73 of the projection 70 presses on the action surface 87 of the contact 77 of each obstacle sensor 74 rearward, and each contact 77 rotates rearward against energization of each contact spring 79. That is, the rearward movement of the bumper 15 is converted into rearward rotating action of each contact 77. Then, in each obstacle sensor 74, when each contact 77 rotates rearward, the sensing surface 84 is moved to a position between the light emitting part 78a and the light receiving part 78b of each sensor unit 78, and the sensing surface 84 blocks reception of light from the light emitting part 78a by the light receiving part 78b. Therefore, the stop of reception of light by the light receiving part 78b is detected through output from the light receiving part 78b, whereby the rotation of the contact 77, that is, the rearward movement of the bumper 15 is detected by each sensor unit 78, and the contact of the obstacle W with the bumper 15, in other words, the existence of the obstacle W is detected indirectly.

Figure 3:
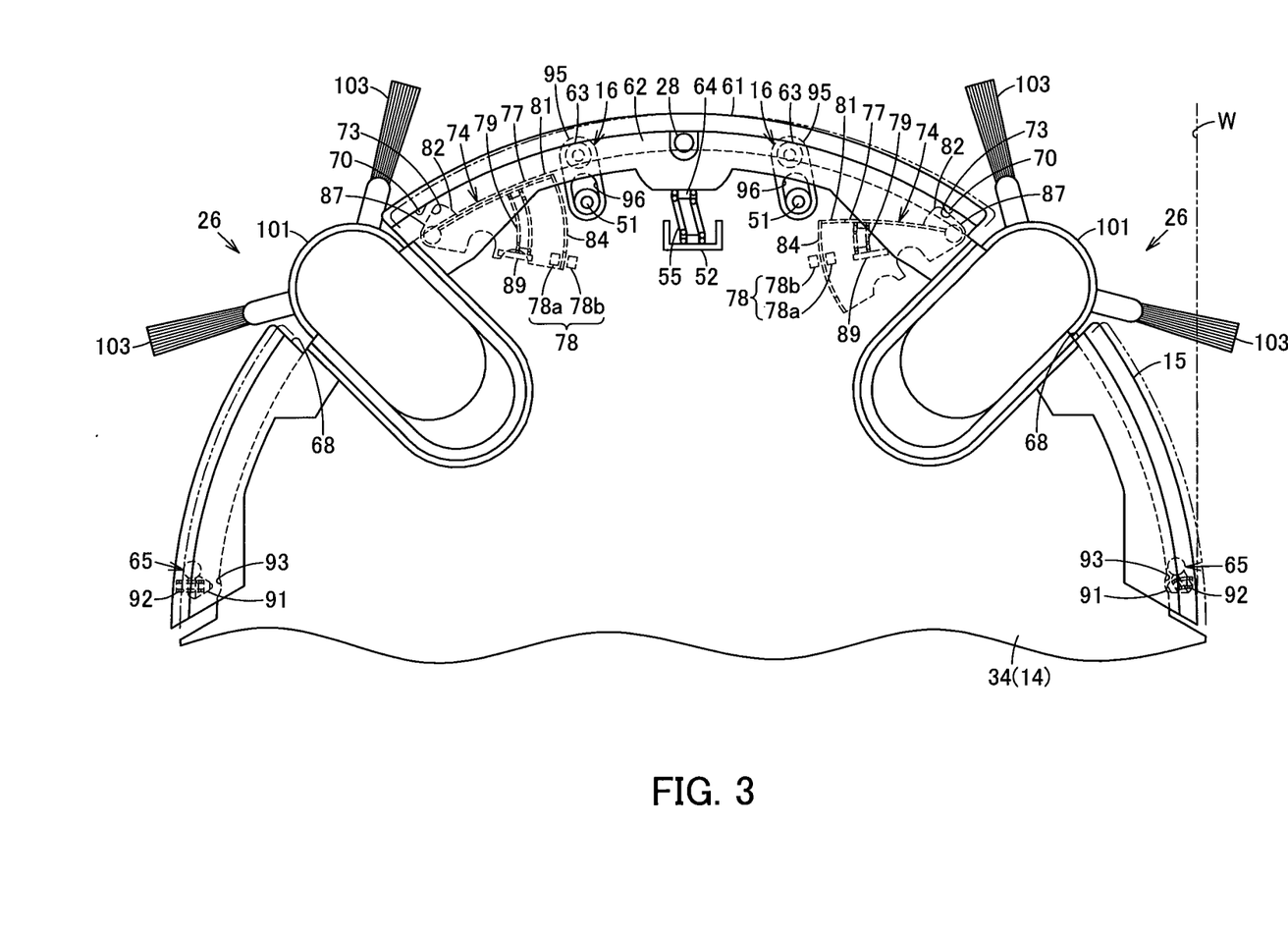
FIG. 3 is a plan view schematically illustrating a part of the autonomous traveling body according to the embodiment when an obstacle is brought into contact with the bumper from the lateral side.
Figure 4A:
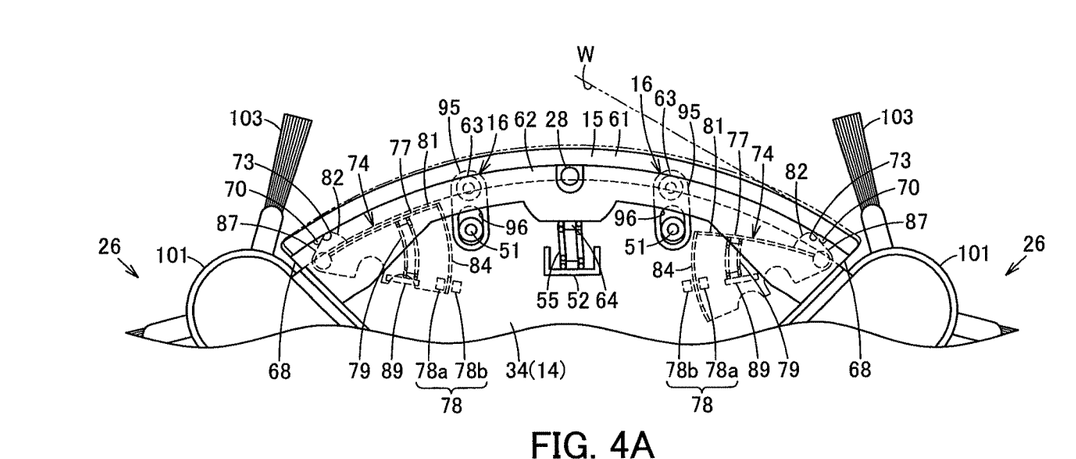
FIGS. 4A and 4B are plan views schematically illustrating a part of the autonomous traveling body according to the embodiment when an obstacle is brought into contact with the bumper from the front oblique direction, in the order of FIG. 4A and FIG. 4B.
Figure 4B:
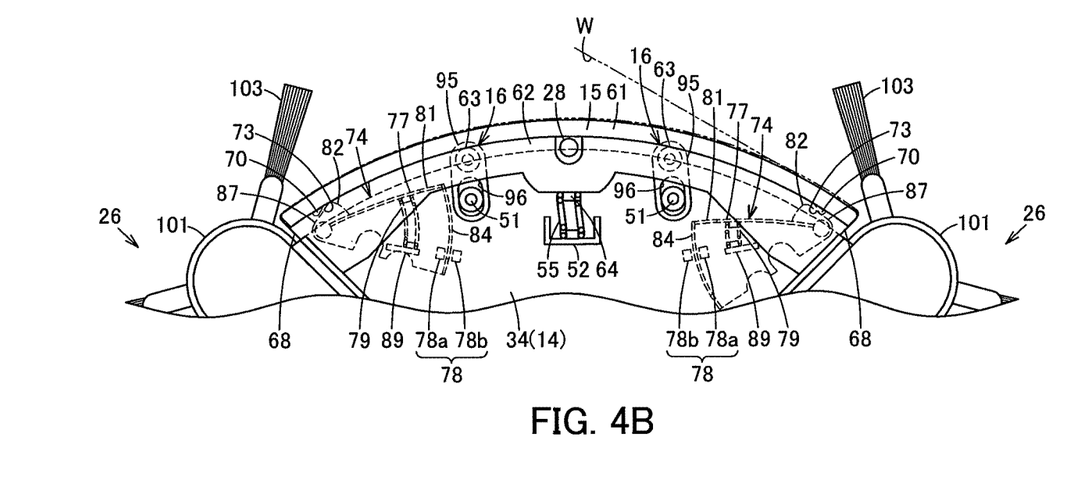

Similarly, when the obstacle W comes into contact with one side (right side) of the bumper 15, as illustrated in FIG. 3, for example, the bumper 15 is moved to the other side (left side) relative to the case main body 14 against energization of the coil spring 92, that is, in a direction crossing (orthogonal to) the energizing direction of the coil spring 55. At this time, in the connector 95 of the link mechanism 16, the front part pivotally supported by the bumper side pivotally supporting part 63 shifts to the other side (left side) relative to the rear part at which the pivotally supporting part 51 of the case main body 14 is inserted through the long hole 96. Thus, the connectors 95 rotate in an inclined manner while keeping the state parallel to each other, and the lever main body 91 of the side lever 65 positioned on one side (right side) that, is the obstacle W side rotates outward against energization of the coil spring 92. Then, when the projection 70 is moved to the other side integrally with the movement of the bumper 15 to the other side, the contact surface 73 presses the action surface 87 of the contact 77 to the lateral side in the obstacle sensor 74 positioned on one side (right-side) that is the obstacle W side, because the contact surface 73 of the projection 70 and the action surface 87 of the contact 77 are formed to be inclined in the front-rear direction and the right-left direction. When the contact surface 73 presses the action surface 87 of the contact 77 to the lateral side, such pressing is converted into rearward pressing force by the inclination of the action surface 87, pressing the contact 77 rearward. Thus, the contact 77 is rotated rearward against energization of the contact spring 79. By contrast, in the obstacle sensor 74 positioned on the other side (left side) that is the opposite side from the obstacle W side, the contact surface 73 does not press the action surface 87 of the contact 77, and the contact 77 does not rotate. That is, only in the (right side) obstacle sensor 74 positioned on the obstacle W side is the movement of the bumper 15 to a side converted into the rearward rotating action of the contact 77. As a result, in the sensor unit 78 of the (right side) obstacle sensor 74 positioned on the obstacle W side, the sensing surface 84 moved to a position between the light emitting part 78a and the light receiving part 78b blocks the reception of light from the light, emitting part 78a by the light receiving part 78b. Therefore, the stop of reception of light by the light receiving part 7 8b is detected through output from the light receiving part 78b, in the same manner as above, whereby the rotation of the contact 77, that is, the movement of the bumper 15 to a side is detected, and the contact of the obstacle W with the bumper 15 is detected indirectly.

Furthermore, when the obstacle W is brought into contact with a front side part of the bumper 15, the operation combining operation illustrated in the above FIG. 2 and FIG. 3 is performed. That is, the bumper 15 is moved diagonally rearward relative to the case main body 14, whereby the action surface 87 of the contact 77 of the obstacle sensor 74 positioned on the obstacle W side is pressed by the contact surface 73 of the projection 70 of the bumper 15, and the action surface 87 of the contact 77 of the obstacle sensor 74 positioned on the opposite side of the obstacle W is separated from the contact surface 73 of the projection 70 and is pressed by an inner surface of the bumper 15. Then, the rotation of the contact 77, that is, the movement of the bumper 15 is detected in the same manner, and the contact of the obstacle W with the bumper 15 is detected indirectly.

That is, as illustrated in FIG. 2, FIG. 3, FIG. 4A, and FIG. 4B, as the direction of the obstacle W brought into contact with the bumper 15 is moved from the front side to the lateral side, the obstacle sensor 74 positioned on the obstacle W side detects more rapidly than the obstacle sensor 74 positioned on the opposite side. When the obstacle W is brought into contact with a lateral side of the bumper 15, only the obstacle sensor 74 positioned on the obstacle W side performs detection, and the obstacle sensor 74 on the opposite side does not perform detection. Therefore, the obstacle sensors 74, 74 can detect a direction of the obstacle W based on the presence or absence of detection by each of the obstacle sensors 74, 74 and detection timing (time difference of detection).

Note that the bumper 15 brought into contact, with the obstacle W keeps the state in contact with the obstacle W by energization of the coil spring 55, and returns to the original normal position, when the vacuum cleaner 11 (main body case 12) is moved to a position where the bumper 15 is not in contact with the obstacle W.

Moreover, when the obstacle W is brought into contact with each side brush 26 projecting further to the outer side than the contour of the bumper 15 (main body case 12), that is, the outer surface of the bumper main body 61 of the bumper 15, each side brush 26 is moved, along the guiding part 53, toward the center side (retracting direction) of the main body case 12 into the brush engagement part 68, against energization of the brush energizing spring 102, as illustrated in FIGS. 5A and 5B. At this time, each side brush 26 reciprocates independently from the bumper 15 without interlocking with the bumper 15 in the first moving range, that is, a range between a position further outside than the contour of the bumper 15 (main body case 12) and a position where the envelope surface of the contour becomes substantially flush with the distal end side of each side brush 26 (FIG. 5A). Note that the distal end side of each side brush 26 is formed along an arc, whereby even when the side brush 26 is brought into contact with the obstacle W along a tangent direction of turn (tangent direction of the main body case 12) while the vacuum cleaner 11 (main body case 12) is turned, for example, the outer force applied due to such contact is converted into a retracting direction, and movement in the retracting direction toward the main body case 12 side is possible. Moreover, in the second moving range, that is, a range between a position where the distal end side of the side brush 26 becomes substantially flush with the envelope surface of the contour of the bumper 15 (main body case 12) and the inner position thereof, the brush contact part 106 of each side brush 26 is brought into contact with each of the contact parts 69, 69 of the bumper 15. Thus, the side brush 26 reciprocates integrally by interlocking with the bumper 15 (FIG. 5B). Therefore, in the second moving range in which the side brush 26 has been moved by a given amount or larger in the retracting direction, each side brush 26 acts as a part of the bumper 15. Thus, when the side brush 26 is brought into contact with the obstacle W in the second moving range, the rotation of the contact 77 is detected by each obstacle sensor 74, similarly to the action of the bumper 15 as illustrated in the above FIG. 2, FIG. 3, FIG. 4A and FIG. 4B, and the obstacle W is detected indirectly.

Note that each side brush 26 brought into contact with the obstacle W keeps the contact state with the obstacle W by energization of the brush energizing spring 102, and returns to the original normal position where the distal end side projects further to the outer side than the contour of the bumper 15 (main body case 12) when the vacuum cleaner 11 (main body case 12) is moved to a position where the side bush 26 is not in contact with the obstacle W.

As a result, the vacuum cleaner 11 of the embodiment can detect the obstacle W brought into contact with a substantially front half of the contour of the main body case 12 by each obstacle sensor 74.

Note that the cleaning body 103 of the side brush 26 projecting further to the outer side than the contour of the main body case 12 is bent elastically due to contact with the obstacle W, and thus does not prevent contact of the side brush 26 or the bumper 15 with the obstacle W.

When the obstacle W is detected, the vacuum cleaner 11 acts to avoid the obstacle W. For example, the vacuum cleaner 11 travels to the direction separated from the obstacle W, that is, rearward, so that the side brush 26 or the bumper 15 does not collide with the obstacle W (the obstacle sensor 74 does not detect the obstacle W), or turns at that position to change the advancing direction to a direction not toward the obstacle W. Then, the vacuum cleaner 11 sucks, from the suction port 42 on which negative pressure generated by the drive of the electric blower 21 acts, dust on the facing surface to be cleaned or dust raked by the side brushes 26, 26 together with air. Moreover, the rotary brush 43 rakes dust on the surface to be cleaned from the suction port 42.

The dust sucked from the suction port 42 or the dust raked by the suction port 42 is introduced to the dust, collection unit 22 and collected, and the air separated from the dust is sucked by the electric blower 21 and, after cooling the electric blower 21, is discharged as exhaust air to the outside of the main body case 12 through the exhaust ports 41.

When it is determined that the cleaning of an area to be cleaned has been completed, the control unit 27 controls the vacuum cleaner 11 to travel autonomously to a position of the charging base, and stops the electric blower 21 and the like. In addition, the control unit 27 stops the motors 98, 98 to finish operation after connecting (physically and electrically) the charging terminal to the charging base, and charges the secondary battery 29.

According to the above-described embodiment, the bumper 15 is connected to be movable in a relatively horizontal direction with respect to the case main body 14 through the link mechanisms 16, 16, and the bumper 15 is energized between the link mechanisms 16, 16 to a direction separated from the case main body 14. Thus, when the bumper 15 is moved, due to contact, with the obstacle W, in at least one of the rearward direction that is the opposite direction of the energizing direction of the coil spring 55 and the right-left direction crossing (orthogonal to) such a direction, the obstacle sensors 74, 74 detect such movement and thus detect the obstacle W. Therefore, it is possible to detect the obstacle W brought into contact, with the bumper 15 in a wide range from both sides to the front side of the bumper 15, that is, a substantially front half of the main body case 12, with a simple configuration without complicating the configuration with a number of sensors and switches.

Moreover, each obstacle sensor 74 can detect the obstacle W by converting the movement of the bumper 15 into the rotation of the contact 77, which allows space-saving, as compared with the configuration in which the operation is performed in accordance with the movement of the bumper 15, for example.

To be more specific, in each obstacle sensor 74, the non-contact type sensor unit 78 detects the rotation of the contact 77 using the sensing surface 84 of the contact 77.

Thus, it is possible to detect the rotation of the contact 77 more easily and securely with a simple configuration.

Furthermore, the contact 77 is rotated by pressing the action surface 87 along a tangent direction of the rotation of the contact 77 by the projection 70 (contact surface 73) of the bumper 15. Thus, a pressing direction of the action surface 87 due to the movement of the bumper 15 to the rear direction and the right-left direction can be securely converted into a pressing direction toward a rotating direction of the contact 77, whereby the contact 77 can be rotated more easily and securely.

Moreover, space is not sufficiently secured on both right and left sides of the main body case 12 because the driving wheels 23, 23 are positioned there. However, the obstacle sensors 74, 74 are arranged on the opposite side to each other relative to the center line L of the main body case 12, and the action surface 87 is positioned on the opposite side relative to the center line L so that the center line L side of the contact 77 rotates along the front-rear direction. In this way, the obstacle sensors 74, 74 can be arranged with a simple configuration and in a space-saving manner using the front part of the main body case 12 where space can be secured more easily. In addition, the obstacle sensors 74, 74 can detect the movement of the bumper 15 securely and efficiently because they are arranged in the vicinity of the center line L and thus hardly influenced by deflection of the bumper 15 and the like.

Furthermore, the obstacle sensors 74, 74 detect, a direction of the obstacle W based on the presence or absence of detection by each of the detection obstacle sensors 74, 74 and detection timing. Therefore, it is possible to easily recognize a direction of the obstacle W relative to the main body case 12 without using a high-cost sensor and the like, allowing the main body case 12 to travel autonomously while avoiding the obstacle W more securely.

Moreover, the side brushes 26, 26 can reciprocate by interlocking with the bumper 15 in the state where the side brushes 26, 26 have been moved in the retracting direction to a position where the distal end thereof becomes substantially flush with the contour of the bumper 15. Thus, the position of the side brushes 26, 26 can be also used, for detection of the obstacle W, which reduces (removes) a range in which the obstacle W cannot be detected.

Note that although the obstacle sensor 74 is configured to detect a front-rear direction and a right-left direction in the above-described embodiment, obstacle sensors for a front-rear direction and for a right-left direction can be provided separately.

Moreover, the side brush 26 is configured to advance or retract by interlocking integrally with the bumper 15 in the second moving range. However, it is possible to configure such that the side brush 26 and the bumper 15 may not be operated by interlocking with each other.

Furthermore, the side brush 26 may be provided at only one of the right and left sides of the main body case 12. Alternatively, the side brush 26 may not be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An autonomous traveling body, comprising:
   a main body case that includes a main body part and a bumper arranged at an outer edge of the main body part;
   a driving wheel that enables the main body case to travel;
   a link mechanism that connects the bumper to be movable in a relatively horizontal direction with respect to the main body part;
   a bumper energizing body that energizes the bumper in a direction separated from the main body part;
   a pair of obstacle detectors that is arranged at positions facing the bumper in the main body part respectively and that detects an obstacle by detecting movement of the bumper, due to contact with the obstacle, in at least one of a direction opposite to an energizing direction of the bumper energizing body and a direction crossing the direction; and
   a controller that controls drive of the driving wheel based on detection of the obstacle by the obstacle detectors to allow the main body case to travel autonomously,
   wherein the bumper energizing body energizes the bumper in a direction opposite to a moving direction of the bumper in case the bumper moves in a direction other than the direction opposite the energizing direction of the bumper energizing body.

2. The autonomous traveling body according to claim 1, wherein each obstacle detector can detect the obstacle by converting movement of the bumper into rotation.

3. The autonomous traveling body according to claim 2, wherein each obstacle detector includes:
   a contact that is provided in the main body part so as to be rotatable, that is energized in a direction rotating toward the bumper, and that rotates against energization by being pressed by the bumper due to movement of the bumper relative to the main body part, and
   a non-contact type sensor that detects contact of the bumper with the obstacle by detecting a rotation of the contact.

4. The autonomous traveling body according to claim 3, wherein
   the contact includes an action surface that is provided along a tangent direction of rotation, and
   the bumper includes, at a position facing the main body part, a pressing part that presses the action surface by movement relative to the main body part.

5. The autonomous traveling body according to claim 4, wherein
   each obstacle detector is arranged on opposite sides to each other relative to a center line along a front-rear direction of the main body case,
   the action surface of each contact is positioned on an opposite side relative to a side of the center line, and
   an end part of each contact near the side of the center line can rotate along the front-rear direction.

6. The autonomous traveling body according to claim 1, wherein the pair of obstacle detectors can detect a direction of the obstacle based on a presence or absence of detection by each of the obstacle detectors and detection timing.

7. The autonomous traveling body according to claim 1, wherein the link mechanism is pivotally supported to be rotatable to the bumper and to the main body part respectively in both sides sandwiching the bumper energizing body and includes a pair of connectors connecting the bumper and the main body part.

8. The autonomous traveling body according to claim 1, comprising an energizing body that energizes the bumper in a direction opposite to the moving direction of the bumper arranged in both sides sandwiching the bumper energizing body and the link mechanism.

\* \* \* \* \*